United States Patent
Hirai

[11] Patent Number: 5,944,345
[45] Date of Patent: Aug. 31, 1999

[54] RESIN AIRBAG

[75] Inventor: Kinji Hirai, Kanagawa, Japan

[73] Assignee: Takata Corporation, Tokyo, Japan

[21] Appl. No.: 08/906,829

[22] Filed: Aug. 6, 1997

[51] Int. Cl.⁶ .................................................. B60R 21/20
[52] U.S. Cl. ..................................... 280/743.1; 280/728.2
[58] Field of Search .............................. 280/743.1, 728.2

[56] References Cited

U.S. PATENT DOCUMENTS

| | | | |
|---|---|---|---|
| 3,705,645 | 12/1972 | Konen | 280/743.1 |
| 4,010,055 | 3/1977 | Oka et al. | 280/743.1 |
| 5,114,180 | 5/1992 | Kami et al. | 280/743.1 |
| 5,447,330 | 9/1995 | Tagawa et al. | 280/743.1 |
| 5,452,914 | 9/1995 | Hirai | 280/743.1 |

FOREIGN PATENT DOCUMENTS 2-31965   2/1990   Japan .
4-266544  9/1992   Japan .

*Primary Examiner*—Kenneth R. Rice
*Attorney, Agent, or Firm*—Foley & Lardner

[57] ABSTRACT

To strongly bond synthetic resin sheets which constitute together an air bag, a circular front panel 2 made of synthetic resin and a circular rear panel 3 made of synthetic resin having an opening 4 at the center thereof through which an inflator is inserted are bonded to each other with adhesive resin 5 to form the air bag 1. The peripheral edge of the front panel 2 is positioned outside the peripheral edge of the rear panel 3. The adhesive resin 5 adheres to the peripheral end face 2s and an inner surface 2i of the front panel 2 and to the peripheral end face 3s and an outer surface 3a of the rear panel 3. The adhesive resin 5 has a concave stepped portion 6 extending along the outer periphery at the corner between the outer peripheral surface and a rear panel-side surface of the adhesive resin 5.

7 Claims, 3 Drawing Sheets

RESIN AIRBAG

BACKGROUND OF THE INVENTION

The present invention relates to an air bag made up of resin sheets which are bonded each other. The purpose of an air bag device is to protect an occupant by deploying an air bag when a vehicle comes into collision. Conventionally, an air bag is typically made of woven textile of fiber, such as polyamide fiber, surfaced with a silicone rubber coating. In recent years, however, an air bag made of resin films (Japanese Unexamined Patent Publication No. H2-31965/1990) and an air bag made of elastomer (Japanese Unexamined Patent Publication No. H4-266544/1992) have been proposed as alternatives to the conventional air bag.

SUMMARY OF THE INVENTION

Conventionally, resin films or elastomer sheets are joined by adhesion or heat fusion which is a simple method of joining such sheets, but it is difficult to obtain uniform bond strength and uniform joint by using either method. It is an object of the present invention to strongly join resin sheets forming an air bag and improve the reliability on the joint.

The present invention provides a resin air bag comprising a plurality of resin sheets which are lapped one over the other and bonded to each other at the peripheries thereof to form a bag configuration. Each of the sheets comprises an inner surface facing the inside of the air bag and an outer surface facing the outside of the air bag. At the bonded portion, the sheets are lapped one over the other in such a manner that the inner surface of a first sheet is opposed to the inner surface of a second sheet. These sheets are bonded to each other with adhesive resin adhering to at least a portion of the outer surface of the first sheet and end faces of the first and second sheets.

According to the present invention, a peripheral portion of the second sheet may extend out of the periphery of said first sheet. The adhesive resin may be applied also to the inner surface of the second sheet. In this case, it is preferable that the adhesive resin adheres only to the outer surface and the end face of said first sheet and the inner surface and the end face of the second sheet.

According to the present invention, the adhesive resin may be formed by injection molding, and a gate of a mold used for the injection molding may be disposed to face the outer surface of said first sheet. In this case, the adhesive resin may have a concave stepped portion extending along the peripheral surface of the adhesive resin at the corner between said peripheral surface and the outer surface of the adhesive resin on the first sheet. In addition, adhesive resin may have a groove formed a portion thereof on said first sheet and extending in parallel with the peripheral edge of the first sheet between the peripheral edge of said first sheet and the gate.

PREFERRED EMBODIMENTS OF THE INVENTION

Hereinafter, an embodiment of the invention will be described with reference to the drawings.

FIG. 1 is a plan view of a driver-side air bag 1 according to an embodiment of the present invention, FIG. 2 is a sectional view showing the deployment state of the air bag, FIG. 3 is a sectional view taken along a line III—III of FIG. 1, and FIG. 4 is a sectional view showing a mold for molding the air bag.

The air bag 1 comprises a circular front panel 2 and a circular rear panel 3 having an opening 4 at the center thereof through which an inflator (not shown) is inserted. The panels 2 and 3 are made of synthetic resin sheets and are bonded to each other with adhesive resin 5 to form the air bag 1.

The diameter of the front panel 2 is slightly greater than that of the rear panel 3 so that the peripheral edge 2a of the front panel 2 is positioned outside the peripheral edge 3a of the rear panel 3 when superposed each other. The adhesive resin 5 adheres to the peripheral end face 2s and an inner surface (a surface facing the inside of the air bag 1) 2i of the front panel 2 and adheres to the peripheral end face 3s and an outer surface (a surface facing the outside of the air bag 1) 3a of the rear panel 3.

The adhesive resin 5 has a concave stepped portion 6 extending along the outer periphery at the corner between the outer peripheral surface and a rear panel-side surface of the adhesive resin 5. The resin 5 is molded by injection molding and has a gate mark 5a formed during the injection molding and holes 5b for taking out pins which pushed the rear panel 3 to the front panel 2. The resin 5 also has a groove 5c extending in parallel with the peripheral edge of the rear panel 3 between the gate mark 5a and the concave stepped portion 6.

For bonding the front panel 2 to the rear panel 3, the panels 2 and 3 are first superposed one upon another inside molds 7, 8 as shown in FIG. 4(a) and then resin is injected into cavities of the mold 7 through a land 9 of the mold 7 by an injection molding machine (not shown).

The gate 10 is disposed in the mold 7 facing the rear panel 3. The mold 7 is provided with a convex stepped portion 11 for forming the aforementioned concave stepped portion 6. The mold 7 is also provided with a convex stripe 12 extending in parallel with the peripheral edge 3a of the rear panel 3 between the gate 10 and the peripheral edge of the rear panel 3. The mold 7 has pins 14 to push the rear panel 3 against the front panel 2.

The cavities 13a, 13b are filled with the resin injected into the molds 7, 8 through the gate 10. After that, the molds 7, 8 are separated to take off the air bag 1 composed of the panels 2, 3 which are bonded by the resin 5. It should be understood that the pins 14 make holes 5b, the convex stripe 12 makes the groove 5c, and the convex stepped portion 11 makes the concave stepped portion 6.

In the injection of the resin 5, the resin injected to the gate 10 first flows around the periphery of the rear panel 3 along the convex stripe 12. That is, the convex stripe 12 restricts the flow of the resin 5 so that the resin 5 easily flows into the cavity 13a near the center of the rear panel 3 and thus the cavity 13a is filled with the resin 5 in preference to the cavity 13b. After that, the resin flows into the cavity 13b at the outer peripheral side through the narrow neck-like clearance 13c between the convex stripe 12 and the rear panel 3. The clearance between the mold 7 and the rear panel 3 is narrowed because the convex stepped portion 11 projects into the cavity 13b. Therefore, the resin flowing through the clearance 13c flows smoothly toward the space between the mold 7 and the end face 2s of the front panel 2.

The front panel 2 and the rear panel 3 are pushed by the pins 14 and the resin from the land 9 also pushes the rear panel 3 to the front panel 2. Therefore, the rear panel 3 closely adheres to the front panel 2 throughout the injection of the resin 5 so that the adhesive resin 5 never flows between the panels.

If a mold 17 which does neither have the convex stripe 12 nor the convex stepped portion 11, nor the pins 14 is employed instead of the mold 7 as shown in FIG. 4(b). The resin injected from the land 9 first flows toward the peripheral edges 2a, 3a of the panels 2, 3 with great force because the resin tends to flow to a place with low resistance. Therefore, it is difficult for the resin to flow in the circumferential direction of the cavity, more particularly the circumferential direction on the rear panel 3. Since the farther from the land 9, the lower becomes the strength pressing the rear panel against the front panel due to injection pressure, and the resin flows around the peripheries 2a and 3a of the front and rear panels with great force and bounces off the inner surface 17a of the mold 1, the resin tends to enter between the rear panel 3 from the front panel 2. Furthermore, since the rear panel 3 is not pushed by the pin 14, the resin easily enter between the panels 2 and 3.

Using the molds 7, 8 of FIG. 4(a) described above can form the air bag, as shown in FIGS. 3(a) and 3(b), wherein the peripheral edges of the panels 2, 3 are superposed directly and the resin 5 is formed in uniform thickness on the rear panel 3. The uniform thickness of the resin 5 on the rear panel 3 results in the uniform bond strength between the front panel 2 and rear panel 3.

According to the present invention, it is preferable that the length from the peripheral edge of the first sheet such as rear panel to the peripheral edge of the second sheet such as front panel is in a range from 1 to 5 mm, more preferably from 2 to 3 mm. The range can render efficiently high bond strength between the adhesive resin 5 and the first sheet such as the front panel.

It is preferable that the material of the sheets is synthetic resin such as urethane thermoplastic elastomer, ester thermoplastic elastomer, styrene thermoplastic elastomer, olefin thermoplastic elastomer, butadiene thermoplastic elastomer, and isoprene thermoplastic elastomer, more preferably urethane thermoplastic elastomer or ester thermoplastic elastomer.

It is preferable that the adhesive resin is the same thermoplastic elastomer as the aforementioned material of the sheet or soft polyolefine resin, more preferably urethane thermoplastic elastomer.

In the aforementioned embodiment, the adhesive resin 5 is formed not to extend to the outer surface of the front panel 2, thereby reducing the thickness of the peripheral end of the air bag. Since the peripheral edge of the front panel 2 is in contact with the mold 8 as shown in FIG. 4, the front panel 2 never moves in the direction apart from the rear panel 3. This prevents the uneven configurations of the joints so as to stabilize the bond strength.

Though the aforementioned embodiment relates to a driver-side air bag, the present invention can be applied to an air bag for protecting an occupant in a passenger seat or a rear seat.

As apparent from the above description, according to the present invention, synthetic resin sheets constituting an air bag can be strongly bonded to each other. Further, the air bag successfully has the peripheral end of reduced thickness. Yet further, the adhesive resin never enters between the sheets, thereby quite strongly bonding the sheets together.

Figure 1:
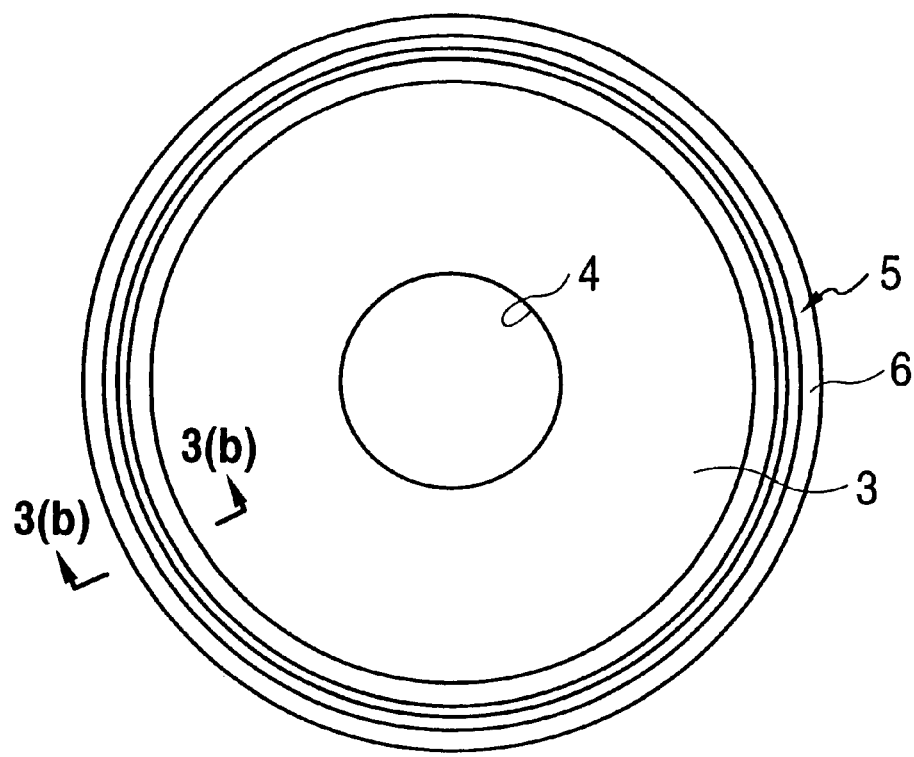
FIG. 1 is a plan view of an air bag according to an embodiment.
Figure 2:
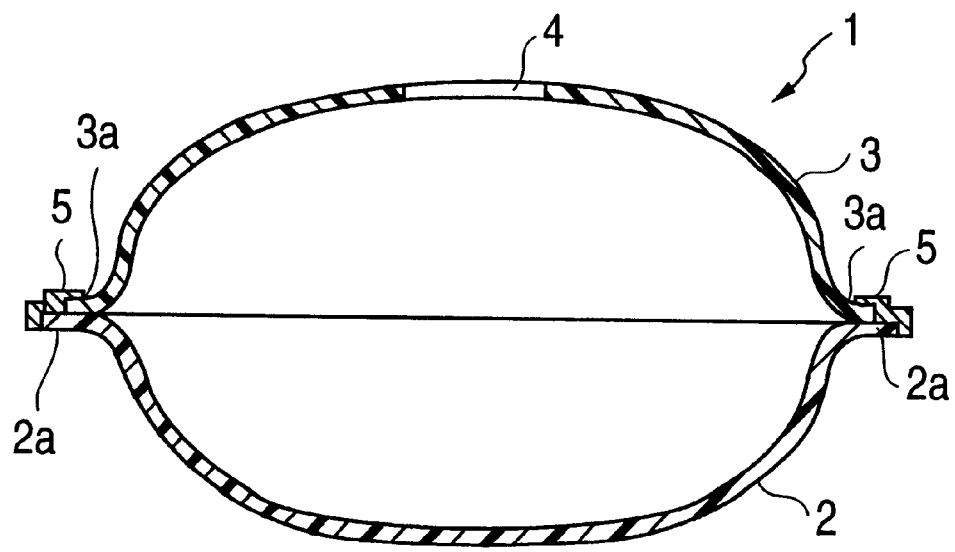
FIG. 2 is a sectional view showing the air bag shown in FIG. 1 in the deployed state.
Figure 3A:
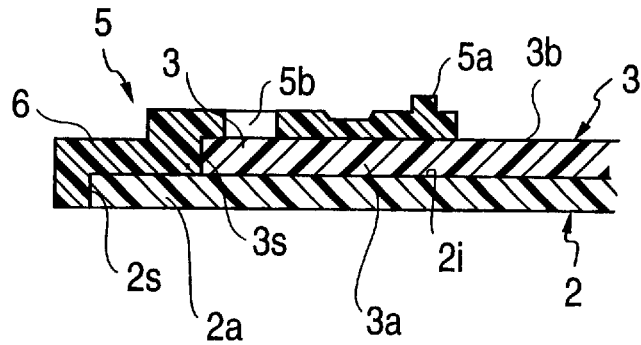
FIG. 3(a) is a sectional view taken along the line III—III of FIG. 1 and also showing the section taken along the line IIIB—IIIB of FIG. 3(b)
Figure 3B:
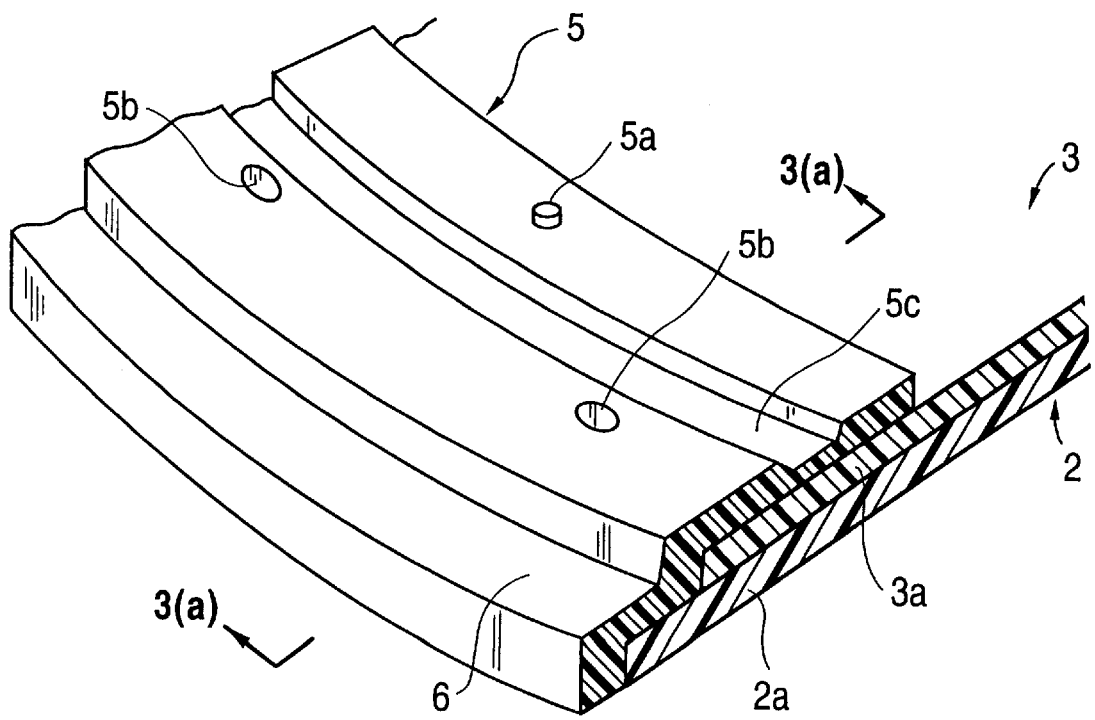
FIG. 3(b) is a perspective view showing the same parts as shown in FIG. 3(a)
Figure 4A:
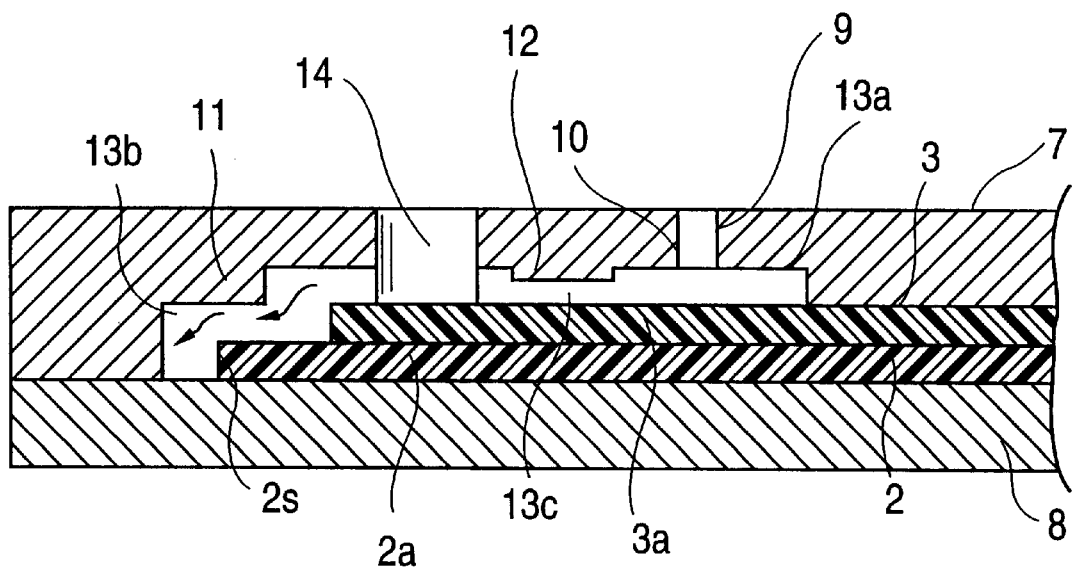
FIG. 4(a) is a sectional view of a mold for producing the air bag according to the embodiment.
Figure 4B:
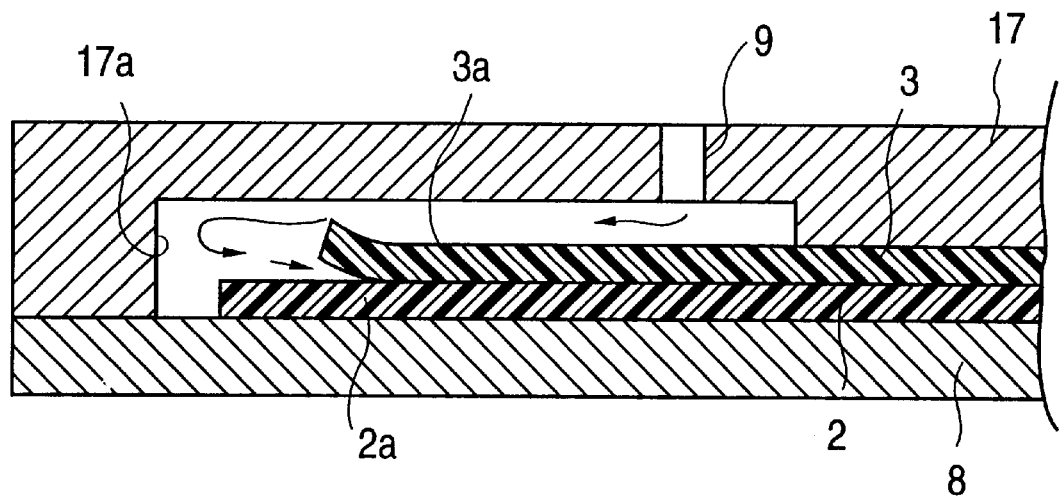
FIG. 4(b) is a sectional view of a mold as comparative example.

What is claimed is:

1. A resin air bag comprising a plurality of resin sheets which are lapped one over the other and bonded to each other at the peripheral portions thereof to form a bag configuration to form a bonded portion, each of the resin sheets comprises an inner surface facing the inside of the air bag and an outer surface facing the outside of the air bag, wherein the sheets are lapped one over the other at the bonded portion in such a manner that an inner surface of a first sheet is opposed to an inner surface of a second sheet, wherein said sheets are bonded to each other with adhesive resin adhering to at least a portion of the outer surface of the first sheet and end faces of the first and second sheets.

2. A resin air bag as claimed in claim 1, wherein a peripheral portion of said second sheet extends out of the periphery of said first sheet, and wherein said adhesive resin adheres also to said inner surface of said second sheet.

3. A resin air bag as claimed in claim 2, wherein said adhesive resin adheres only to the outer surface and the end face of said first sheet and the inner surface and the end face of the second sheet.

4. A resin air bag as claimed in claim 3, wherein said adhesive resin is formed by injection molding, and wherein a gate of a mold used for the injection molding is disposed to face the outer surface of said first sheet.

5. A resin air bag as claimed in claim 4, wherein said adhesive resin has a concave stepped portion extending along the peripheral surface of the adhesive resin at the corner between said peripheral surface and the outer surface of the adhesive resin on said first sheet.

6. A resin air bag as claimed in claim 4, wherein said adhesive resin has a groove formed a portion thereof on said first sheet and extending in parallel with the peripheral edge of the first sheet between the peripheral edge of said first sheet and the gate.

7. A resin air bag as claimed in claim 1, wherein resin sheets are synthetic resin sheets.

* * * * *

UNITED STATES PATENT AND TRADEMARK OFFICE
CERTIFICATE OF CORRECTION

PATENT NO. : 5,944,345
DATED : August 31, 1999
INVENTOR(S) : Kinji HIRAI

It is certified that error appears in the above-indentified patent and that said Letters Patent is hereby corrected as shown below:

Title Page Item [30] Foreign Application Priority Date, please insert --August 6, 1996 [JP] Japan 8-207082--

Signed and Sealed this

Thirtieth Day of January, 2001

Attest:

Q. TODD DICKINSON

Attesting Officer

Director of Patents and Trademarks